March 13, 1962 M. S. LAMBERT 3,024,893
SKIRTBOARD AND SEALER FOR CONVEYOR SYSTEMS
Filed Dec. 18, 1959
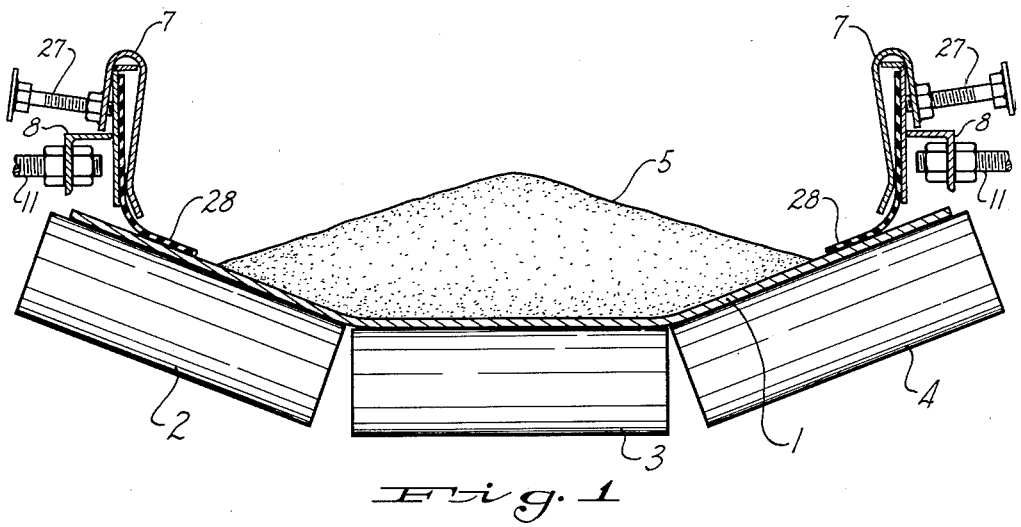
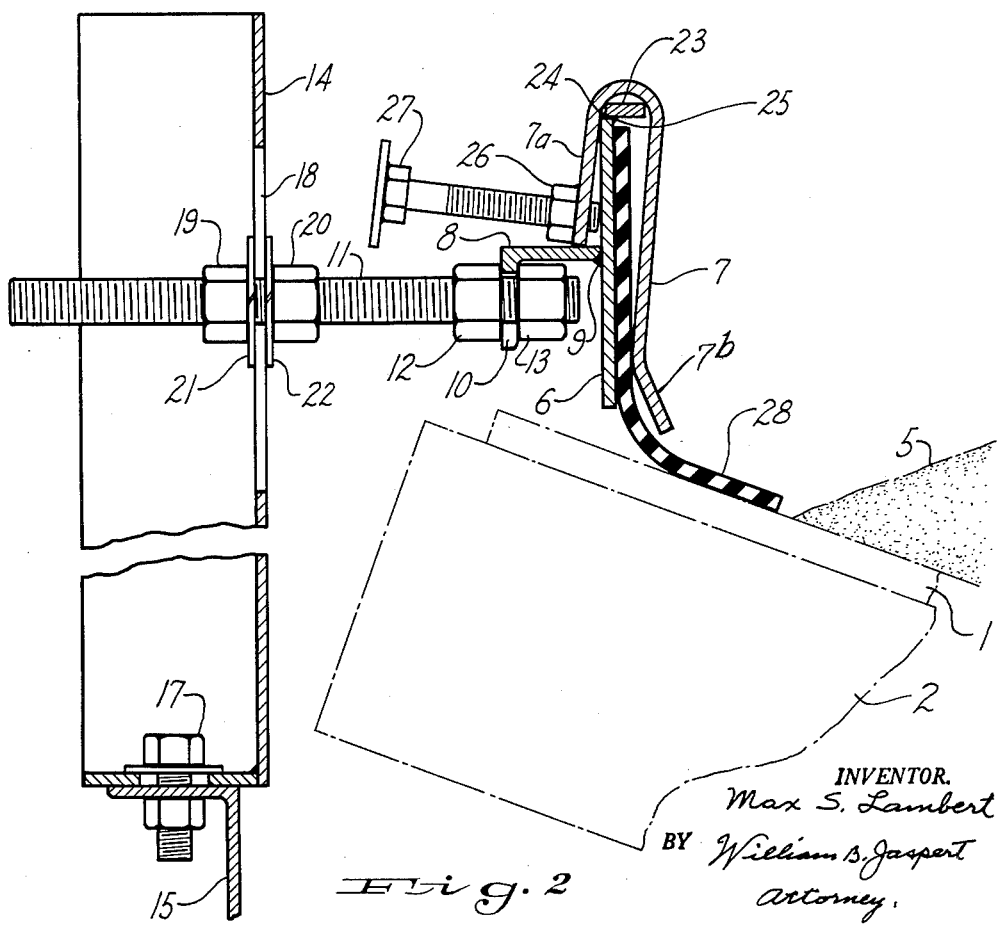
INVENTOR.
Max S. Lambert
BY William B. Jaspert
Attorney.

United States Patent Office 3,024,893
Patented Mar. 13, 1962

3,024,893
SKIRTBOARD AND SEALER FOR CONVEYOR SYSTEMS
Max S. Lambert, 325 S. Linden Ave., Pittsburgh 8, Pa.
Filed Dec. 18, 1959, Ser. No. 860,518
4 Claims. (Cl. 198—204)

This invention relates to new and useful improvements in prefabricated adjustable skirtboards that are applicable to belt conveyor systems, said skirtboards having clamp attachments for sealing strips.

It is among the objects of this invention to provide a conveyor skirtboard construction which is readily mounted to the conveyor stringer and which have adjustable means for varying the spacing of the skirtboards and their relative position to each other and to the conveyor belt with which they cooperate.

The invention will become more apparent from a consideration of the accompanying drawing constituting a part hereof in which like reference characters designate like parts and in which:

FIGURE 1 is a cross-sectional view, partially in elevation, taken transversely of a conveyor belt and skirtboard mounting therefor embodying the principles of this invention; and, FIGURE 2 is a vertical section, partially in elevation, of an enlargement of the skirtboard and its mounting structure.

With reference to the drawings, the numeral 1 designates an endless conveyor belt of rubber, or other belt material, which is flexible to the extent of conforming to its supports, which in FIGURE 1 consist of journaled idler rollers 2, 3 and 4 that support the belt. The rollers may be mounted, as shown, to provide a trough-like contour to the belt 1 on which the material designated by the numeral 5 is supported. The material may be fines or granules such as ores, coke dust or other materials used in mining or steel producing operations. In accordance with the present invention, the material is confined to the conveyor belt by means of skirtboards which consist of two parts; a backbone 6, FIGURE 2, and the skirtboard proper designated by the numeral 7. The backbone 6 is a steel plate welded to a piece of angle iron 8 at 9 which is provided with a slotted portion 10 for receiving a bolt 11 to which it is secured by nuts 12 and 13. The bolt 11 is mounted on a structural element 14 that is supported on a conveyor stringer 15 to which it is secured by bolt 17, as shown in FIGURE 2. The structural member 14 is provided with a slot 18 of the width of the bolt and of a length to allow for vertical adjustment of the bolt 11 so that the entire skirtboard may be moved vertically towards or away from the conveyor belt 1, the bolt 11 being secured in the slotted opening by nuts 19 and 20 with washers 21 and 22 of a size to span the slot.

An important feature of the invention is the use of fulcrum pieces 23 which are secured to the top of the backbone 6 by welding, as at 24 and 25. The skirtboard 7 loops over the fulcrum piece 23 and has a short leg 7a that extends parallel with the face of the skirtboard, as shown. The short leg piece is provided with a threaded body portion which may be supplied by welding a nut 26 to the face of the leg 7a and a bolt 27 extends through the threaded portion 26 and engages the backbone 6. Disposed between the backbone 6 and skirtboard 7 is a sealing strip 28 of rubber which may be from ¼" to ½" in thickness and any suitable width and extends the full length of the skirtboard. The sealing strip 28 is clamped between the backbone 6 and skirtboard 7 by turning bolt 27 which causes the bent lower edge of the skirt 7 to move toward making horizontal line contact with the backbone 6 to clampingly engage the sealing strip 28. The more the bolt is turned, the more pressure is brought to bear on the sealing strip. This clamping action is a result of the action of the fulcrum 23 which causes the skirtboard 7 to exert a clamping force along its lower edge towards the backbone 6 clamping the skirtboard against the sealing strip 28. The flared-out portion 7b of the skirt that is below the line of clamping shields the seal 28 from major side pressure of material on the belt, permitting the sealing strip to be of a relatively thin substance. By clamping the sealer strip 28 so far down requires little of it to be used for attachment to the backbone or skirt and saves the trouble and expense incident to attaching the seal material by bolting as in conventional practice.

It is obvious that the sealing strip 28 may be used up to within a short portion of its width by loosening the bolts 27 and adjusting it vertically to maintain sealing engagement with the conveyor belt 1.

It is further evident from FIGURE 1 of the drawing that the sealing strip 28 conforms to the contour of the belt and prevents the fines of the burden 5 on the conveyor belt from escaping from the belt or from interfering with the free running of the belt as would be the case if the material would get between the ordinary steel skirtboard and the belt.

By adjusting the nuts 19 and 20, the skirtboards can be adjusted inwardly to shape the material on the conveyor belt or they can be adjusted outwardly to allow greater spreading or larger loads to be conveyed.

It is evident from the foregoing description of this invention that skirtboards and sealing grips for endless conveyor belts made in accordance therewith may be applied to any existing conveyor structure as it may be easily installed or removed and is adjustable to suit all conditions met with in belt conveying.

Although one embodiment of the invention has been herein illustrated and described, it will be evident to those skilled in the art that various modifications may be made in the details of construction without departing from the principles herein set forth.

I claim:

1. A combined skirtboard and sealer clamp structure for conveyor belts consisting of vertically disposed backbone plates extending parallel with and on both sides of a conveyor, skirtboards of inverted U-shaped resting on said backbone plates having a short leg with clamping means engaging said backbone plate for rocking said skirt on its support and a sealer strip disposed between the long leg of said skirtboard and the front of said backbone plate, the long leg of said skirtboard being flared outwardly to move toward making horizontal line contact when subjected to clamping movement of said clamping means and to shield the sealer strip from side pressure of material on the conveyor belt.

2. A combined skirtboard and sealer clamp structure for conveyor belts as set forth in claim 1 in which the clamping means consists of a threaded bolt on the short leg of the skirtboard for engaging the rear of the backbone, said bolt when turned causing the U-shaped skirtboard to fulcrum on the top of the backbone to draw the long depending skirt portion in clamping engagement with the sealer strip.

3. Apparatus as set forth in claim 1 in which the top of the backbone member is provided with a combined fulcrum and spacing member on which the U-shaped skirt rests and pivots when subjected to clamping action to draw the skirt portion against the sealer strip.

4. Apparatus as set forth in claim 1 in which the top of the backbone member is provided with a flange extending from the front of the backbone member on which the U-shaped skirt rests and pivots when subjected to clamping action to draw the skirt portion against the sealer strip.

References Cited in the file of this patent

FOREIGN PATENTS

| | | |
|---|---|---|
| 211,715 | Australia | Oct. 25, 1956 |
| 1,084,249 | France | July 7, 1954 |